(12) United States Patent
Wu et al.

(10) Patent No.: US 8,339,722 B1
(45) Date of Patent: Dec. 25, 2012

(54) METHODS OF DEMODULATING A SERVO POSITON ERROR SIGNAL ON PATTERNED MEDIA

(75) Inventors: Zining Wu, Los Altos, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 34 days.

(21) Appl. No.: 12/620,367

(22) Filed: Nov. 17, 2009

Related U.S. Application Data

(60) Provisional application No. 61/115,322, filed on Nov. 17, 2008.

(51) Int. Cl.
*G11B 5/09* (2006.01)
(52) U.S. Cl. .............................................. 360/46; 360/51
(58) Field of Classification Search .................. None
See application file for complete search history.

(56) References Cited

U.S. PATENT DOCUMENTS

| | | | | |
|---|---|---|---|---|
| 5,089,757 A | * | 2/1992 | Wilson | 318/560 |
| 5,138,511 A | * | 8/1992 | Hoshimi et al. | 360/135 |
| 5,301,072 A | * | 4/1994 | Wilson | 360/77.01 |
| 5,440,532 A | * | 8/1995 | Yokogawa et al. | 369/47.18 |
| 5,583,713 A | * | 12/1996 | Real et al. | 360/77.08 |
| 5,590,009 A | * | 12/1996 | Ishida | 360/135 |
| 5,602,692 A | * | 2/1997 | Freitas et al. | 360/77.08 |
| 5,854,714 A | * | 12/1998 | Reed et al. | 360/51 |
| 6,084,538 A | * | 7/2000 | Kostelnik et al. | 341/120 |
| 6,181,505 B1 | * | 1/2001 | Sacks et al. | 360/77.08 |
| 6,469,849 B1 | * | 10/2002 | Ellis et al. | 360/29 |
| 6,594,094 B2 | * | 7/2003 | Rae et al. | 360/25 |
| 6,770,388 B2 | * | 8/2004 | Uwazumi et al. | 428/829 |
| 6,868,431 B1 | * | 3/2005 | Finol et al. | 708/300 |
| 6,999,279 B2 | * | 2/2006 | Lundstrom | 360/131 |
| 7,525,755 B2 | * | 4/2009 | Asakura et al. | 360/77.08 |
| 7,643,234 B2 | * | 1/2010 | Albrecht et al. | 360/48 |

* cited by examiner

*Primary Examiner* — K. Wong

(57) ABSTRACT

Systems, methods and computer program products for estimating a position of a head in relation to a storage medium are described. A read channel can be used to receive a readback signal containing servo information obtained from a storage medium, and to demodulate the received servo information including position error signals to deduce a position of a read/write head in relation to the storage medium. The read channel can demodulate the received servo information to obtain amplitude and/or phase information. In some implementations, digital sampled values can be generated based on the readback signal, and the digital sampled values can be integrated using an integrator to obtain accurate and reliable amplitude and phase information that are used to determine the position of the read/write head.

22 Claims, 7 Drawing Sheets

METHODS OF DEMODULATING A SERVO POSITON ERROR SIGNAL ON PATTERNED MEDIA

CROSS-REFERENCE TO RELATED APPLICATIONS

This application claims priority to U.S. Provisional Application Ser. No. 61/115,322 entitled "METHODS OF DEMODULATING THE SERVO POSITION ERROR SIGNAL ON PATTERNED MEDIA," filed on Nov. 17, 2008, the disclosure of which is incorporated herein by reference in its entirety.

TECHNICAL FIELD

The subject matter of this application is generally related to hard disk drives.

BACKGROUND

Hard-disk drives provide data storage for data processing systems in computers and servers, and are becoming increasingly pervasive in media players, digital recorders, and other personal devices. Recent advances in hard-disk drive technology allow more digital information to be stored on increasingly smaller disks. Recent developments also have simplified hard-disk drive manufacturing processes while yielding increased track densities, thus promoting increased data storage capabilities at reduced costs.

Generally, to write data to a hard disk drive, a read/write head can initiate an electromagnetic field that orients a cluster of magnetic grains, known as a bit, in one direction or the other. To increase the capacity of disk drives, manufacturers have been striving to reduce the size of bits and the grains that make up the bits. Recently, patterned media have been developed in which a magnetic thin film layer is created as an ordered array of highly uniform islands each capable of storing an individual bit. This structure enlarges the disk capacity by imposing sharp magnetic transitions at well-defined pre-patterned positions or bit patterns that are organized as concentric data tracks around a disk.

Because of the tightly-spaced bits, a head-positioning servo mechanism can be used to facilitate the ability of the read/write head to locate a particular data track location and to reposition the read/write head from one location to another. Indexing marks and alignment indices may be recorded in arc-shaped regions on the data tracks, known as servo sectors, and referenced by the servo mechanism to maintain proper dynamic positioning capabilities of the read/write head over time. Track addresses, synchronization signals, and position error signal ("PES") bursts may also be recorded in the servo sectors.

SUMMARY

Systems, methods and computer program products for estimating a position of a head in relation to a storage medium are described. A read channel can be used to receive a readback signal containing servo information obtained from a storage medium, and to demodulate the received servo information including position error signals to deduce a position of a read/write head in relation to the storage medium. The read channel can demodulate the received servo information to obtain amplitude and/or phase information. In some implementations, digital sampled values can be generated based on the readback signal, and the digital sampled values can be integrated using an integrator to obtain accurate and reliable amplitude and phase information that are used to determine the position of the read/write head.

In some implementations, a method can be used that includes receiving a readback signal, the readback signal including positioning information associated with a position of a head of a storage medium; sampling the readback signal to generate a plurality of sampled values; integrating the sampled values to generate a plurality of integrated values; and determining a signal characteristic associated with the readback signal based on the integrated values.

In some implementations, the signal characteristic can be determined that includes at least one of an amplitude and a phase associated with the readback signal.

In some implementations, the readback signal can include an analog readback signal. In some implementations, the analog readback signal can be converted into a digital readback signal, and the digital readback signal can be sampled.

In some implementations, read channel compensation can be performed on the plurality of sampled values to generate a plurality of read channel compensated values, where the read channel compensated values can be integrated to generate the plurality of integrated sampled values.

In some implementations, read channel compensation can be performed including filtering the plurality of sampled values to match the sampled values to a signal quality suitable for bit detection prior to integration, the filtering including passing sampled values with a desirable frequency while blocking sampled values with frequencies outside the desirable frequency.

In some implementations, filtering can include applying a first stage of filtering to the plurality of sampled values to match the sampled values to the signal quality; and applying a second stage of filtering to the filtered sampled values including compensating the filtered sampled values for drooping of a DC level associated with the readback signal.

In some implementations, the readback signal can be received that includes information from a single continuous field of sequence of bits written in a same polarity from the storage medium.

In some implementations, the readback signal includes a position error signal, a programmable cutoff frequency can be identified, and the position error signal can be AC-coupled based on the programmable cutoff frequency.

In some implementations, a cutoff frequency sufficiently low to achieve DC coupling that allows DC components associated with the position error signal to pass can be identified.

In some implementations, the position of the head can be adjusted based on the determined signal characteristic.

In some implementations, a device can be used that includes a read channel configured to demodulate a readback signal generated based on servo information written on a storage medium and to determine position information associated with a position of a head of the storage medium, the read channel including: an analog front end to provide amplification to the readback signal; a sampler to generate a plurality of sampled values based on the amplified readback signal; and an integrator to integrate the plurality of sampled values to generate a plurality of integrated values; and an output to output the integrated values through which the position information associated with the head is to be determined.

In some implementations, the analog front end can include an AC-coupling circuit to filter out DC offsets present in the readback signal.

In some implementations, the analog front end can include a DC-coupling circuit to allow DC content in the readback signal to pass to the sampler.

In some implementations, the readback signal can be generated based on servo information extracted from a single continuous field of sequence of bits written in a same polarity on the storage medium.

In some implementations, the sampler can include an analog-to-digital converter; and the plurality of sampled values can include a plurality of digital sampled values provided by the analog-to-digital converter.

In some implementations, the integrator can be a digital integrator. In other implementations, the integrator can be an analog integrator.

In some implementations, the device can further include a first filter to filter the plurality of sampled values; and a second filter to compensate the plurality of filtered sampled values for drooping of a DC level associated with the readback signal.

In some implementations, the second filter can be a linear filter to limit the drooping before integration to improve a signal-to-noise ratio of the readback signal.

In some implementations, the second filter can be a linear filter coupled to an output of the integrator to compensate the integrator output for the drooping.

In some implementations, the second filter can be a non-linear filter to provide linearization of and restore a DC level associated with the readback signal prior to integration.

In some implementations, the second filter can be a non-linear filter coupled to an output of the integrator to compensate the integrator output for non-linear effects at the integrator output.

In some implementations, the analog front end can further include an AC coupling circuit operating at a programmable cutoff frequency.

In some implementations, the programmable cutoff frequency can be programmed sufficiently low to achieve DC coupling that allows DC components associated with the readback signal to pass.

In some implementations, a system can be used that includes a head operable to read servo information from a storage medium and to produce a readback signal based on the servo information, the servo information being read from a single continuous field of sequence of bits written in a same polarity on the storage medium; and a read channel to: demodulate the readback signal; determine position information associated with the head in relation to the storage medium from the demodulated readback signal; and generate a control signal to adjust a position of the head based on the determined position information.

In some implementations, the system can further include an analog front end to provide equalization to the analog readback signal; an analog-to-digital converter to sample the equalized readback signal and to produce a sampled digital signal; a finite impulse response filter to perform filtering to match the sampled digital signal to a signal quality suitable for bit detection; and a decoder to decode the filtered sampled digital signal and to determine the position of the head based on the decoded signal.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
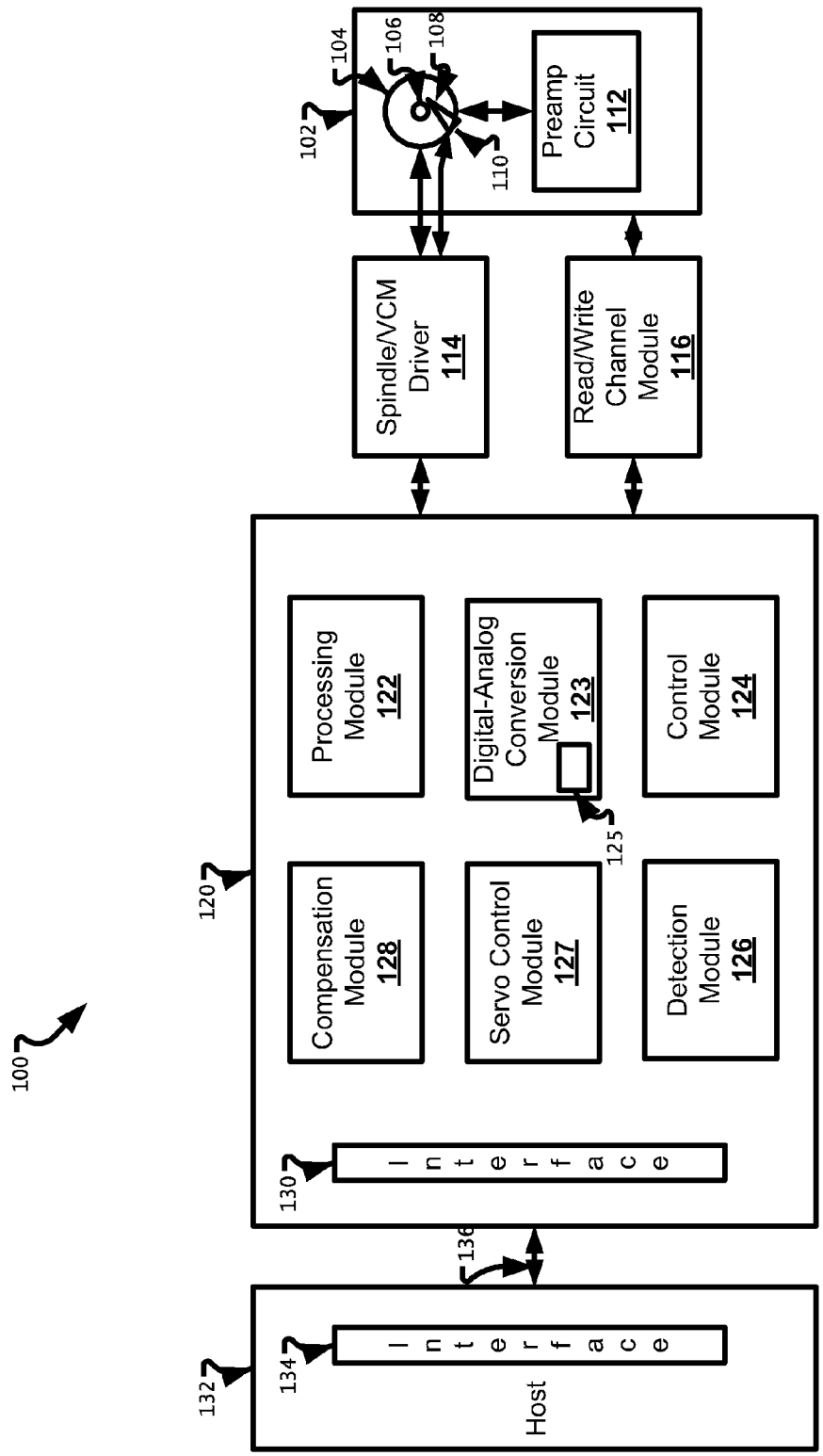
FIG. 1A shows an example of a hard disk drive (HDD) system.

Generally, a storage medium has servo patterns and a data track that overlaps the servo patterns. As a transducer or read/write head passes over the data track, burst signals corresponding to the servo patterns are generated. The generated signals known as position error signals can vary depending upon the radial position of the read/write head with respect to the corresponding track. A read channel system can analyze the position error signals to deduce the position of the read/write head within the track. If the position error signals demonstrate a position deviation from the target position, an actuator controller that controls the movement of the read/write head can adjust the position of the read/write head using the position estimate to realign the read/write head back onto the center of the track.

When the read/write head is directly straddling the track centerline, a position error signal corresponding to a burst pattern should have an amplitude equal to an amplitude of a PES signal corresponding to an adjacent burst pattern. If the read/write head is off-center toward the burst pattern, the amplitude corresponding to the burst pattern should be larger than the amplitude corresponding to the adjacent burst pattern. Similarly, if the read/write head is off-center toward the adjacent burst pattern, the amplitude corresponding to the adjacent burst pattern should be larger than the amplitude corresponding to the burst pattern.

By determining and demodulating the amplitudes of the signals corresponding to both patterns, a position estimate associated with the position of the read/write head can be determined (e.g., by integrating the amplitudes). For example, the magnitude of the position estimate can indicate an approximate displacement or distance of the read/write head from the centerline of a particular track, with a zero value indicating a zero displacement (e.g., when the read/write head is on the centerline). Additionally, a sign of the position estimate can be used to indicate a direction of the displacement from the centerline.

However, the detected position error signals can be skewed due to the closeness of the tracks. Further, the position error signals and the amplitudes thereof can be weak as a result of noise and undesirable signal components present in the demodulated signals. For discrete media where data bits are discretely separated by nonmagnetic materials, the separation can cause a signal interruption to the detected position error signals, which can further reduce the signal threshold at which the position error signals can be detected. Absent any signal compensation, the resulting position error signals can lead to inaccurate positioning data and erroneous adjustment of the read/write head.

In some implementations, the servo pattern can be written with a uniform polarity and in a single continuous island to maximize the amplitude and/or phase of the resulting PES or readback signal. A single continuous island can include a single, unbroken length of magnetic recording material that is magnetized in a single and same direction (e.g., there are no magnetic transitions in a single continuous island). A single continuous island can include, for example, an equivalent length of thirty to fifty bits. For example, instead of writing the servo pattern alternatively in an alternate fashion (e.g., two bits with up polarity in one island, two bits with down polarity in a next island and two bits with up polarity in a succeeding island with each island separated by a nonmagnetic groove), the servo pattern can be written continuously in one island (e.g., instead of multiple discrete pieces) so as to provide a reliable signal pattern (e.g., DC signal) that allows a maximum response while yielding little or no noise in the output signal. Because data is continuously written and read from a single continuous island (as opposed to from several discrete islands), the signal power of the output signal is increased (e.g., since the polarity is all in a same direction).

In some implementations, an integrator can be added to the read channel system for integrating the position error signals so as to increase the amplitude of the readback signals that can result in an improved detectable output signal and yield adequate signal-to-noise ratio (SNR) at the output of the integrator.

In some implementations, prior to integration, the readback signals can be filtered by a low pass filter. The low pass filter can be used to reject noise and improve the SNR ratio of the digital samples before integration. In addition to a low pass filter, a linear or non-linear filter also can be used to limit the extent of, for example, the DC drooping (as will be discussed in greater detail below) of the readback signal before integration so as to improve the quality of the integrator output.

System Overview

FIG. 1A shows an example of a hard disk drive (HDD) system 100. The HDD system 100 includes a head assembly 102 (e.g., that is connected to a voice coil motor), a spindle motor 106, a head 108, an actuator arm 110, a pre-amp circuit 112, a spindle/VCM driver 114, a read/write channel module 116 and a printed circuit board (PCB) 120. Signals between the head assembly 102 and the PCB 120 can be exchanged, for example, through a flexible printed cable. The head assembly 102 can store data on a platter or storage medium 104, and can be connected to the head 108 for writing or reading data. In some implementations, the head 108 can be a read head that performs data reading, a write head that performs data writing or a read and write head that performs data reading and writing.

The storage medium 104 can be read-only or read/write medium and can be magnetic-based or optical-based medium. The storage medium 104 can be in the form of a hard disk platter in a hard disk drive, a floppy disk, a tape, an optical disk (e.g., laser disk, compact disk, digital versatile disk) and the like. The storage medium 104 as depicted in FIG. 1A is illustrative only, and that the systems and techniques as described herein can be used with other types of storage media.

In some implementations, the storage medium 104 can be a continuous media-type magnetic disk. In a continuous media-type magnetic disk, a servo region and a data region can be provided in a magnetic film extending uniformly and continuously. Specifically, the magnetic recording layer can include a continuous film of magnetizable material. In a continuous-media disk, the concentric data tracks are only physically separated by an un-recorded guard-band. The guard band can include the same continuous recording material as the concentric data tracks, but may be erased using, for example, a DC or AC pattern. Nor are the concentric data tracks pre-formed in the recording layer. Rather, the concentric data tracks are formed when, for example, the read/write head 108 creates the magnetization in the continuous magnetic layer. A continuous-media disk can also be a "discrete-track" disk, meaning that the concentric data tracks of continuous magnetic material can be radially separated from one another by concentric nonmagnetic bands. In a discrete-track disk, the nonmagnetic bands can be trenches or grooves, or formed of nonmagnetic material, or contain magnetic material but have surfaces far enough below the surfaces of the data tracks to not adversely impact the readback signals from the data tracks.

Alternatively, the storage medium 104 can be a patterned media-type magnetic disk. In a patterned media-type magnetic disk, the magnetic material on the disk surface can be patterned into small isolated data islands such that a single magnetic domain in each island or "bit" is formed. To produce the required magnetic isolation of the patterned data islands, a pattern of magnetic area/non-magnetic area can be formed in a servo region during the manufacturing process, which then can become a magnetic pattern representing the servo information (e.g., burst signals and preamble information) when the entire servo region is uniformly magnetized. Minute recording dots (e.g., where each corresponds to one bit) can be discretely arranged in a data region while the bit value can be represented by the magnetizing direction or polarity. Because bit patterned media allow separated data bits to be patterned, data bits can be positioned closer together in a bit patterned medium than in a continuous magnetic medium.

In bit patterned medium, information need not be recorded between recording bits, and therefore recording of information can be performed at once after, for example, the read/write head 108 has been positioned accurately above a recording dot. Positioning the read/write head 108 can include positioning the read/write head 108 in the radius direction of the storage medium 104 and synchronizing the timing of generating a readback signal from the storage medium 104 with the timing of passing the recording dot.

The storage medium 104 can be rotated by the spindle motor 106. The spindle motor 106 can rotate the storage medium 104 at a controlled speed during the read/write operations. The read/write actuator arm 110 can move relative to the storage medium 104 in order to read and/or write data to/from the storage medium 104. The spindle/VCM driver 114 can be configured to control the spindle motor 106, which rotates the storage medium 104. If desired, the spindle/VCM driver 114 also can generate control signals for positioning the read/write actuator arm 110 using the voice coil motor, a stepper motor or any other suitable actuator.

The read/write head 108 can be located near a distal end of the read/write actuator arm 110. The read/write head 108 can include a write element (e.g., an inductor) that generates a magnetic field, and a read element (e.g., a magneto-resistive (MR) element) that senses the magnetic field on the storage medium 104.

The HDD head assembly 102 also can include a preamp circuit 112. The preamp circuit 112 can operate either in a read mode or write mode, and can communicate with a read channel system (as will be discussed in greater detail below) to generate and process an analog readback signal. During a user-data read operation, the analog readback signal can be used to retrieve the servo information and user data. The servo information can include positioning data information such as track identification data information and fine positioning information that can be used to determine and adjust the position of the read/write head 108. During a write operation, the preamp circuit 112 also can be used to provide write current for writing a sequence of symbols onto the storage medium 104. Typically, the write current changes polarity upon each change in the binary value of the write data signal.

The PCB 120 can include a processing module 122, a digital-analog conversion module 123 having a digital-analog converter 125, a control module 124, a detection module 126, a servo control module 127, a compensation module 128 and a communications interface 130, each of which is connected through one or more internal buses (not shown).

The processing module 122 can perform data and/or control processing related to the general operation of the HDD system 100. For example, the processing module 122 can execute instructions received from the control module 124 to control disk drive functions. These functions can include, for example, reading and decoding host commands, starting up and controlling the speed of the spindle motor 106, minimizing head positioning servo off track error through the control of the voice coil motor, and managing power consumption of the HDD system 100.

The processing module 122 can include volatile memory (e.g., SDRAM or other types of low latency memory) for storing, for example, volatile control data associated with the control of the HDD system 100, and non-volatile memory (e.g., flash memory) for storing, for example, other data such as non-volatile control code. The control data and control code can include instructions that the processing module 122 executes or utilizes as well as tables, parameters or arguments used during the execution of these instructions. In some implementations, the processing module 122 also can store various firmware routines for controlling the operation of the spindle motor 106 such as, without limitation, startup routines, speed control routines, spin down routines and parking routines.

The processing module 122 can include registers and buffers for storing, for example, flags indicating whether a spin-up operation has been successfully completed. Alternatively, the flags can be stored in a register defined by a memory location in a memory unit separate from the processing module 122.

In some implementations, the processing module 122 can include a pulse width modulation (PWM) controller (not shown) for generating control signals so as to control the spindle/VCM driver 114 to drive the spindle motor 106 at a substantially constant speed while the disk drive is in use. The spindle/VCM driver 114 can receive VCM control signals from the PWM controller and generate a corresponding command signal to command the voice coil motor for positioning the actuator arm 110 and the read/write head 108, for example, as part of a parking operation. The voice coil motor can be controlled by the servo control module 127, and can be configured to apply torque to the actuator arm 110 so as to swing the read/write head 108 during, for example, a track-seeking operation and to maintain the read/write head 108 at a desired angular position during a track-following operation.

The spindle/VCM driver 114 can, in some implementations, include an electromotive force (EMF) detector (not shown) for detecting a back EMF (BEMF) associated with one or more windings of the spindle motor. The control module 124 can communicate with the spindle/VCM driver 114, for example, to receive zero crossing information to be used for identifying the instant at which a zero crossing occurs (e.g., a zero crossing in the BEMF induced in a floating winding), and for determining a spin rate of the spindle motor. As an example, while the spindle motor 106 is rotating, the EMF detector can detect the BEMF zero crossing point for an un-driven winding to generate a zero crossing signal (e.g., by counting clock pulses and determining time elapsed between the consecutive detected zero crossings). The control module 124 can receive the zero crossing signal and provide information associated with the zero crossing signal to the processing module 122, for example, to compute the velocity of the spindle motor 106.

The control module 124 can function to manage and handle data transfer between the PCB 120 and a host 132 during read and write operations through the communications interfaces 130/134, which can be connected through a bus 136. The control module 124 also can include servo logic for managing the positioning of the read/write head 108 when seeking (e.g., moving from one track to a non-adjacent track) and during tracking (e.g., staying on a single track).

The control module 124 can communicate with the communications interface (e.g., an input/output interface) 130 and with the spindle/VCM driver 114 or the read/write channel module 116. The control module 124 can coordinate control of the spindle/VCM driver 114, the read/write channel module 116, the processing module 122, the detection module 126 and the compensation module 128.

The control module 124 can receive a command from the host 132 to generate a spin-up command while the spindle motor 106 is at rest to begin the spin-up mode of operation. The processing module 122 can receive the spin-up command from the control module 124 and retrieve an associated control routine for the spin-up mode of operation from a memory unit.

During write operations, the read/write channel module 116 can encode (e.g., using run length limited coding (RLL)) data to be written by the read/write head 108 and generate encoded write signals. The read/write channel module 116 also can process the write signals providing a reliability check and can apply, for example, error correction coding (ECC) and/or similar algorithms to allow for the verification of the integrity of the data that is written. During read operations, the read/write head 108 can generate readback signal (e.g., analog readback signal), and the read/write channel module 116 can convert the analog readback signal into digital read signals. The converted signals can be detected and decoded to recover data written by the read/write head 108, as will be discussed in greater detail below.

In some implementations, portions of the HDD system 100 can be implemented as one or more integrated circuits (IC) or chips. For example, the processing module 122 and the control module 124 can be implemented in a single chip. As another example, the spindle/VCM driver 114 and the read/write channel module 116 can be implemented in a same (or different) chip as the processing module 122 and the control module 124. As yet another example, the HDD system 100 other than the HDD head assembly 102 can be implemented as a system-on-chip.

Read Channel System

Figure 1B:
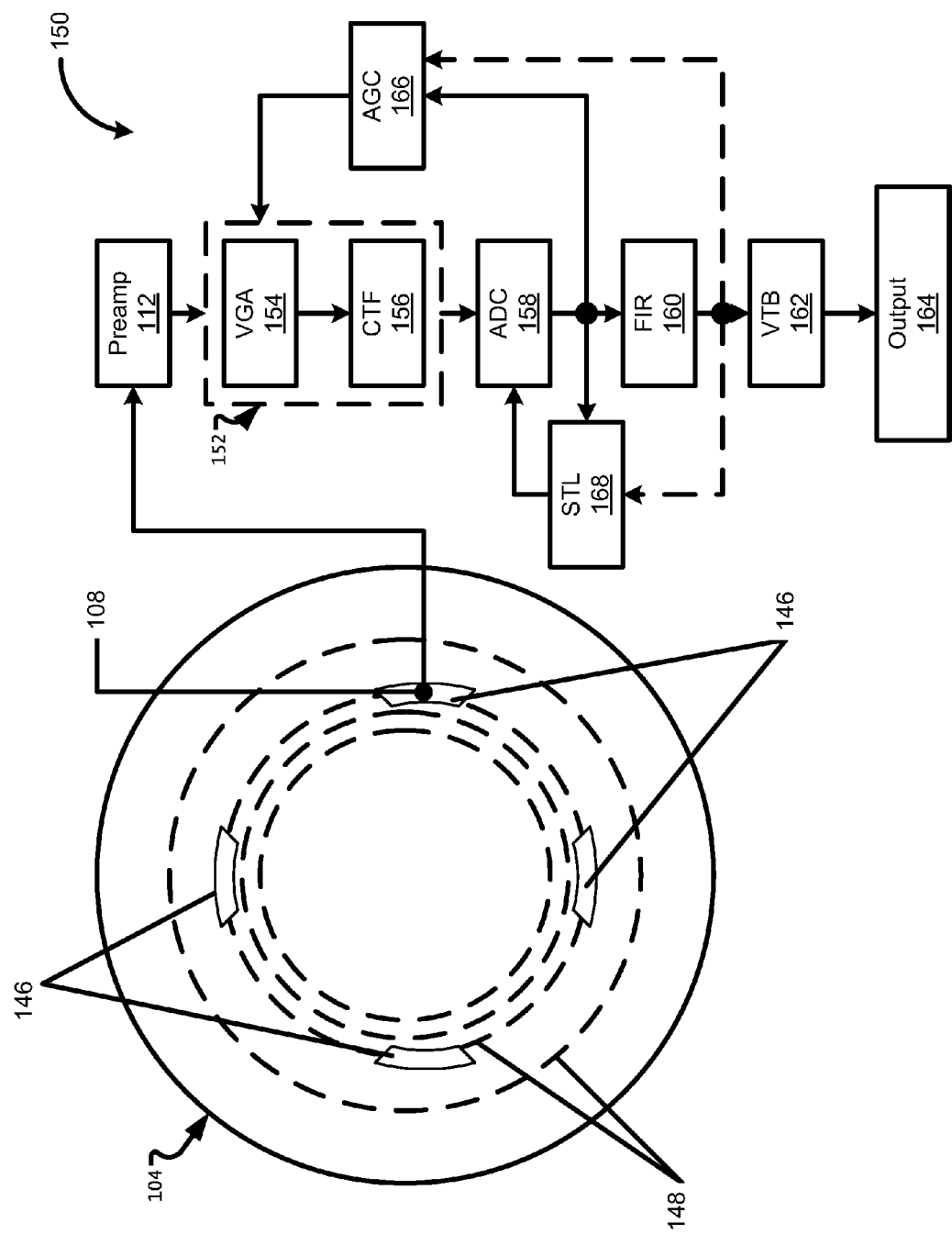
FIG. 1B is a block diagram showing an example of a read channel system for reading data.

FIG. 1B is a block diagram showing an example of a read channel system 150 for reading data from the storage medium 104 using the read/write head 108. In some implementations, the read channel system 150 can be integrated with or external to the read/write channel module 116. In other implementations, the read channel system 150 can be integrated with the processing module 122, or the servo control module 127.

As shown in FIG. 1B, the read channel system 150 can communicate with the preamp circuit 112, and can include an analog front end (AFE) 152, an analog-to-digital converter (ADC) 158, a servo timing loop (STL) 168, an automatic gain control (AGC) unit 166, a finite impulse filter (FIR) 160, and a Viterbi decoder (VTB) 162. In some implementations, the read channel system 150 can be used to provide read data position information encoded on the storage medium 104.

The read channel system 150 can be coupled to the read/write head 108 for reading data from the storage medium 104. The storage medium 104 can include multiple data tracks 148 each of which can be encoded with data representing position information. The data tracks 148 can be concentrically located areas defining tracks on a surface of the storage medium 104. Data can be stored on the storage medium 104, and the data positions, by which the data is written to and read from the storage medium 104, can be encoded in multiple servo wedges 146 that are positioned on each data track 148. The data on a data track 148 can be retrieved by positioning the read/write head 108 over a servo wedge 146.

After reading the storage medium 104, the read/write head 108 can generate an analog readback signal. In some implementations, the analog readback signal can be preamplified by the preamp circuit 112 to produce an amplified analog readback signal. The AFE 152 then can process the preamplified analog readback signal to provide filtering and gain control. The AFE 152 also can be optimized for the data transfer rate of the servo information being read by the read/write head 108.

In some implementations, the AFE 152 can include a variable-gain amplifier (VGA) 154 and a continuous time filter (CTF) 156 that can be regulated by the AGC unit 166. The VGA 154 and the CTF 156 can receive the analog readback signal from the preamp circuit 112, and further compensate or amplify the analog readback signal (e.g., to amplify an amplitude of the analog readback signal and remove any undesired noise). For example, the VGA 154 can regulate the gain of the analog readback signal, and the CTF 156 can perform waveform equalization of the analog readback signal with symmetrical amplitude.

Output of the AFE 152 can be subject to sampling and quantization by a sampler. In some implementations, the sampler can include the ADC 158 that can be used to generate raw digital samples. For example, the ADC 158 can convert the analog readback signal from continuous-time domain to discrete-time domain, the result of which can be fed to the FIR digital filter 160 to be shaped to a desired target response. Though not shown, the read channel system 150 also can include a phase locked loop that can be used to provide timing for the sampling. Alternatively, sampling can be performed asynchronously (e.g., using an asynchronous clock). In some implementations, the analog readback signal can be sampled by the AFE 152 without being converted into digital samples. In some implementations, the analog samples can be fed to the integrators as will be discussed in greater detail below.

The ADC 158 can sample the analog readback signal at a particular baud rate. This oversampling can spread the frequency response to expose the higher frequency harmonics. The FIR digital filter 160, which can be a bandpass filter, can filter and condition these high frequency harmonics to provide clean raw digital samples before passing the filtered digital samples to the VTB 162 for decoding. The FIR digital filter 160 can include a sinusoidal filter cascaded with a simple filter for additional filtering. The simple filter can be a comb filter or a cascade of more than one comb filter.

The ADC 158 can be a 6-bit ADC, and the FIR digital filter 160 can be a 9-tap or 10-tap FIR digital filter, which can be programmable or adaptive. In some implementations, the CTF 156, the ADC 158 and the FIR digital filter 160 taken together can be viewed as the signal equalizer within the read channel system 150.

In some implementations, the desired target response output by the FIR digital filter 160 can be fed to the AGC 166 which is a timing loop configured to adjust, for example, the sampling phase of the ADC 158 so that signal sampling can be performed at the correct timing periods. In some implementations, the STL 168 can be configured to adjust the sampling phase once the estimate of the magnitude (or phase) of the readback signal has been determined. In some implementations, the estimate of the magnitude or phase can be estimated in a one-time fashion to derive a residual estimation error, and the residual estimation error can subsequently be reduced by, for example, applying an adaptive loop to the gain (e.g., using AGC 166) and an adaptive loop to the sampler (e.g., using the STL 168). Although not shown, a DC control unit also can be used to apply DC correction at one or more locations in the main read path.

Subsequently, the VTB decoder 162 can decode the desired target response to generate a decoded data sequence (e.g., decode the digital sample stream and output a binary signal), which can be provided to the output 164. Through the output 164, a post processor such as a media noise processor can be used to further refine the decoded data sequence to identify and correct any error in the decoded data sequence. As will be recognized, additional signal processing components also can be included after the VTB decoder 162, and these signal processing components can be separate electronic components, or integrated into the read channel system 150 or the VTB decoder 162. For example, the VTB decoder 162 can be used to obtain the binary sequence of the decoded data sequence and to reconstruct the ideal target channel output.

Servo Information

In some implementations, the read channel system 150 can be used to read servo information stored on the storage medium 104, and to provide read data position information associated with the read/write head 108 based on the servo information. As shown in FIG. 1B, the storage medium 104 can include multiple data tracks 148, each of which being encoded with data representing position information. The data tracks 148 can be concentrically located areas defining tracks on a surface of the storage medium 104. The data tracks 148 can be divided into a plurality of data sectors, and can be formatted in radial zones. Radial zones radiating outwardly from the inner diameter (ID) to the outer diameter (OD) of the storage medium 104 can be written at progressively increased data frequencies to take advantage of an increase in linear velocity of the medium surface in the respective radial zones.

The data tracks 148 can be interspersed or segregated by servo data written within the servo wedges 146 (e.g., that extend radially from the ID to the OD). The servo wedges 146, can be curved slightly (e.g., in a form of a spiral) in order to adjust for the trajectory of the read/write head 108 as the read/write head 108 sweeps across the storage medium 104. The servo control module 127 can use the servo wedges 146 to read or write servo information as well as the data tracks 148.

For sake of brevity and simplicity, only four servo wedges 146 are shown. However, one of ordinary skill in the art will readily understand that there can be more than four servo wedges 146 (e.g., hundreds of servo wedges).

The servo wedges 146 can be equally spaced about the circumference of the platter surface. Each servo wedge 146 can include servo patterns written thereon. For example, each servo wedge 146 can include data and supporting bit patterns that can be used for control and synchronization of the read/write head 108 over a desired storage location on storage medium 104. Specifically, the data positions by which the data is written to and read from the storage medium 104 can be encoded in multiple servo wedges 146 positioned on each data track 148.

Servo patterns contained in each servo wedge 146 can be read by the read/write head 108 as the medium surface passes under the read/write head 108. Servo patterns written in the servo wedges 146 can provide the read channel system 150 with head position control information to control the actuator arm 110 when moving the read/write head 108 from starting tracks to destination tracks during random access track seeking operations. The servo patterns also can provide the read channel system 150 with head position control information to control the actuator arm 110 when positioning and maintaining the read/write head 108 in proper alignment with a track during track following operations when user data is read from or written to data sectors in the concentric tracks on the disk surface.

In some implementations, before performing a read/write operation on a section of a given track, the read/write head 108 can lock onto a desired track by referring to the positioning information retrieved using the servo patterns in a given servo wedge 146. By writing the servo wedges 146 onto the storage medium 104, the servo wedges 146 can provide the positioning information necessary to allow the read/write head 108 to read and write data at the correct locations on the storage medium 104. In this instance, data can be correctly read and/or written if servo information is written properly and precisely.

Figure 2:
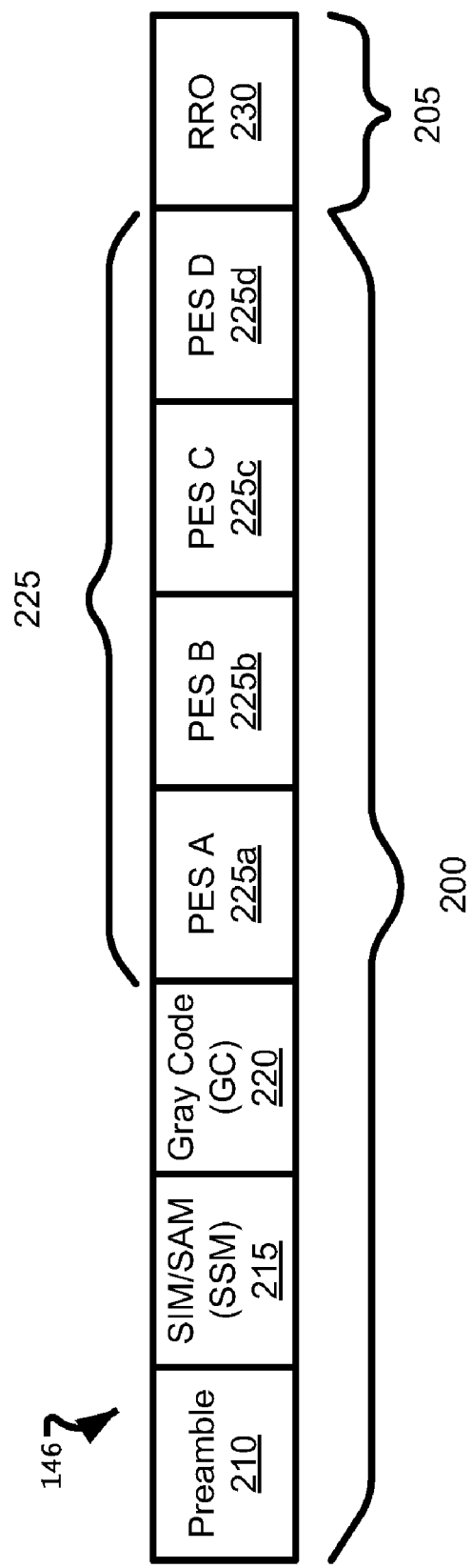
FIG. 2 shows an example format of a servo wedge.

FIG. 2 shows an example format of a servo wedge 146. As shown in FIG. 2, the servo wedge 146 can include a main servo portion 200 and a repeat runout (RRO) portion 205. The main servo 200 can include a preamble 210, a sync mark 215, gray code 220, and a position error signal (PES) field 225, and the RRO portion 205 can include a repeat runout field 230.

The preamble 210 can be generally written ahead of servo information. The preamble 210 can be written at a certain frequency. A phase lock loop circuit can lock onto the frequency associated with the preamble 210 so that subsequent signals can be written with a known phase relationship with the preamble 210. For example, servo patterns can be written so that the servo patterns have a desired phase relationship with the preamble signal. The phase relationship between the servo patterns and the preamble 210 can provide information for the read channel system 150 to properly decode the servo information and generate an accurate reading of the position of the read/write head 108 with respect to the centerline of a data track 148, as will be discussed in greater detail below.

The sync mark 215 can be used to indicate a beginning of actual information such as servo addresses. For example, the sync mark 215 can be used to indicate to the read channel system 150 that a data portion is approaching so that the read channel system 150 can begin to synchronize timing circuitry used during the data read operations. The sync mark 215 can be of any suitable duration and can be programmed with a width corresponding to the width of the read/write head 108.

In some implementations, the head tracking information can be derived from the PES field 225. In some implementations, the PES field 225 can include one or more servo burst fields that can be written on the storage medium 104 in a staggered fashion so that the readback amplitude associated with each servo burst field is different. As will be discussed in greater detail below, by reading the magnitude of the servo bursts in the PES field 225, a back-end servo processor can perform position correction to guide the read/write head 108 on track. The read channel system 150 can then convert the single tone sinusoidal-like burst signals from the readback waveform into clean DC signals, and measure or estimate the magnitude of the burst signals based on the DC signals. For example, burst signals read from the PES field 225 can be demodulated and the amplitude associated with the PES field 225 can be utilized to position the read/write head 108 over the centerline of a data track 146. The PES pattern exhibited by the PES field 225 can include, without limitation, amplitude patterns, null patterns, phase patterns, orthogonal patterns, dual frequency patterns, and the like.

The PES amplitude can vary with the distance of the read/write head 108 from the centerline of the data track 146 and with the sampling phase offset, and can be used as an error correction signal to indicate the position of the read/write head 108. As an example, if the amplitude is above or below a certain threshold level (which indicates that the read/write head 108 is off-track), the read/write head 108 can be repositioned so that the read/write head 108 is on the track centerline. In some implementations, in addition to comparing the amplitude with a predetermined threshold, the read/write head 108 can be positioned in a manner that maximizes an estimated amplitude of one or more of the bursts, and/or minimize an estimated amplitude of remaining bursts.

In some implementations, the PES 225 can include four servo bursts or PES sub-fields; namely, PES A 225a, PES B 225b, PES C 225c and PES D 225d. Other number of sub-fields (e.g., two) also can be used. In some implementations, each of the PES subfields 225a-225d can be written in a staggered position at slightly different positions with sinusoidal waveforms.

Each subfield 225a-225d can be associated with a specific burst pattern having a different positioning offset or phase in the radial direction of the storage medium 104. Based upon the PES amplitude detected when the read/write head 108 crosses each of the PES subfields 225a-225d, positional deviation information indicating the relative distance of the read/write head 108 from the centerline of the track can be determined so that the position of the read/write head 108 can be adjusted if necessary.

In some implementations, additional information such as wedge number information (e.g., to count the number of servo fields in each track when the storage medium 104 is rotating) also can be included in the servo wedge 146. For example, the wedge number can include a single bit to designate an index wedge. In some implementations, the read/write head 108 can be enabled to read the servo wedges 146 (including additional information) prior to, subsequent to, or contemporaneously with reading and/or writing the servo information in the servo wedges 146 on some or all of the remaining regions of the storage medium 104.

PES subfields 225a-225d can be used to identify the location of the read/write head 108 with respect to the track center line. PES subfields 225a-225d can be positioned in a predetermined phase relation to each other. As the read/write head 108 passes over each PES subfield 225a-225d, a readback signal can be generated by the read/write head 108 and demodulated to produce a position error value. For example, at the track center, the position error value can be associated with a zero magnitude while the read/write head 108 passes over the corresponding track. If the read/write head 108 deviates to one side of the track center, the position error value can indicate a positive magnitude identifying the amount of displacement between the track center and the current position of the read/write head 108. Conversely, if the read/write head 108 deviates to the other side of the track center, the position error value can indicate a negative magnitude identifying a corresponding amount of displacement.

Figure 3A:
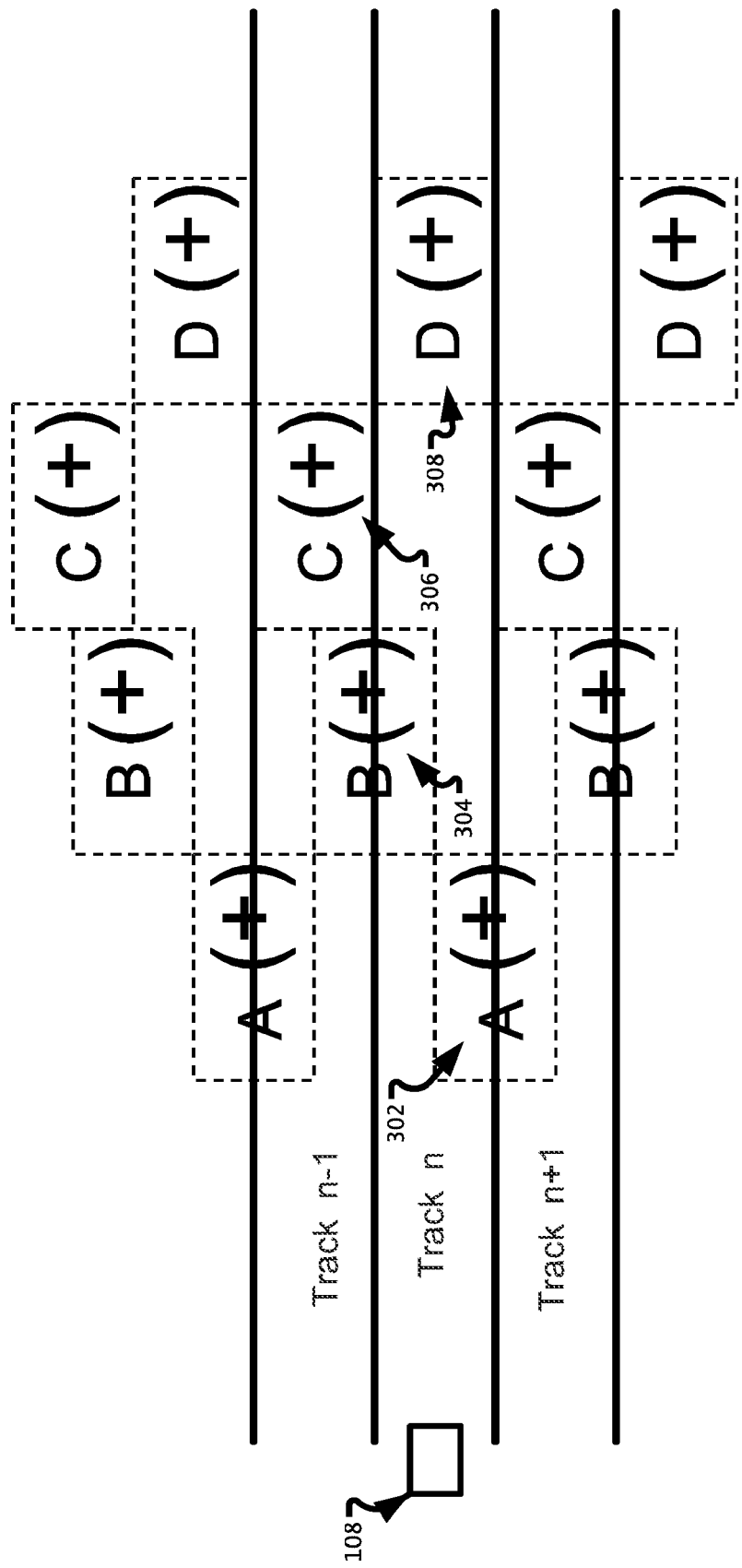
FIG. 3A shows an example of the position of a read/write head relative to a servo pattern.

FIG. 3A shows an example of the position of the read/write head 108 relative to the servo pattern. As shown, the servo patterns includes an A burst 302, a B burst 304, a C burst 306 and a D burst 308 that are radially written in a staggered position. As shown, the read/write head 108 travels along the centerline of track "n". Because the read/write head 108 freely floats above track "n", the position of the read/write head 108 can deviate from the centerline of track "n". In some instances, the deviation can be caused by external or internal disturbances or track placement errors in the patterned tracks. If the read/write head 108 deviates too far from the centerline of track "n", data on track "n" can be read improperly.

Figure 3B:
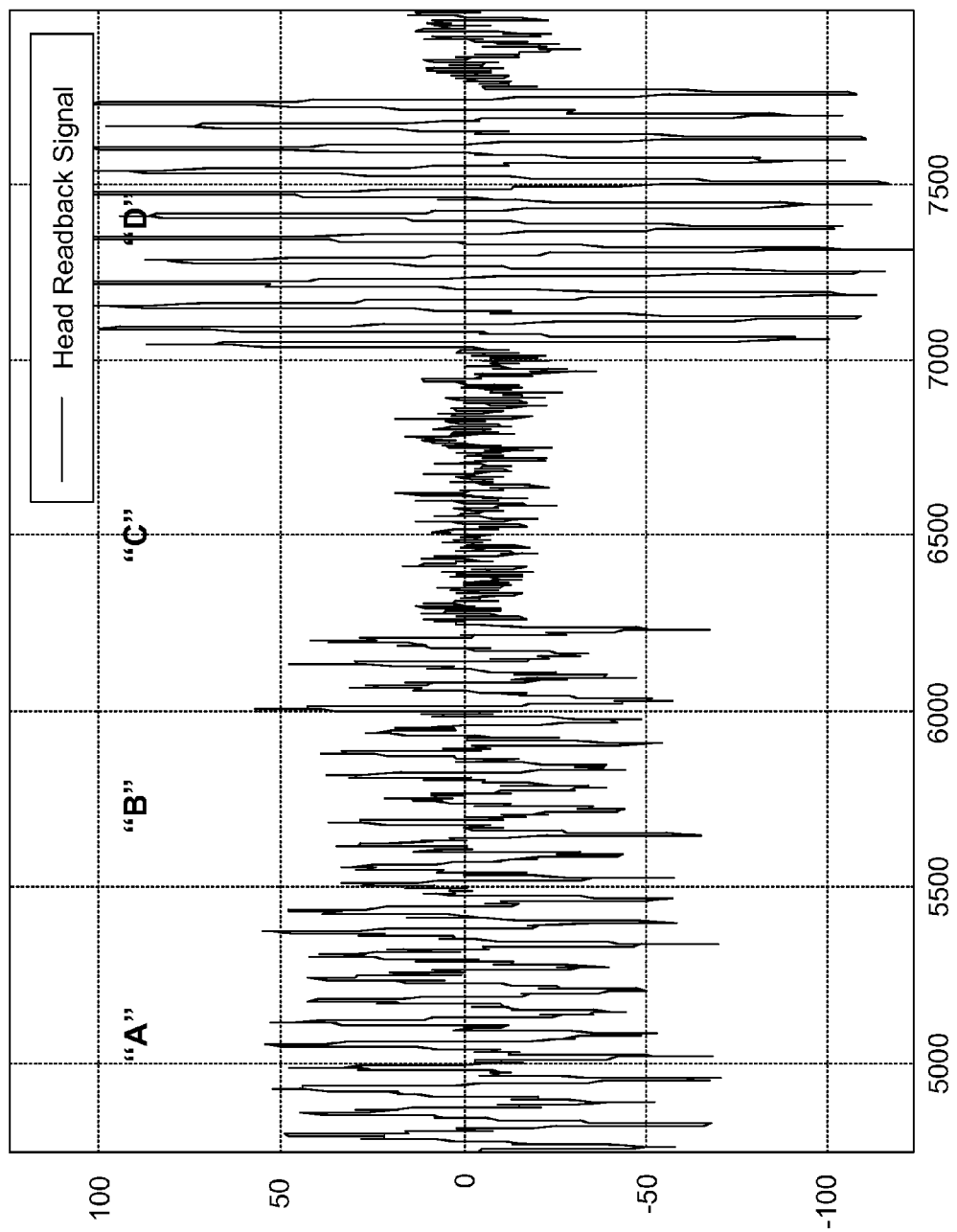
FIG. 3B shows an example of a readback waveform.

When the read/write head 108 is off-centered, the readback signal can have a varying amplitude and phase. An example of a readback waveform is shown in FIG. 3B. Referring to FIG. 3B, as the read/write head 108 travels over the centerline of track "n", half readback amplitude is detected from each of the A burst 302 and the B burst 304. In some implementations, the readback amplitude can be detected through peak detection or determined using a demodulation scheme, as will be discussed in greater detail below. The readback phase associated with the A burst 302 and the B burst 304 also can be detected through the same or different demodulation scheme. Given the readback phase and the readback amplitude, the location of the read/write head 108 with respect to track "n", track "n−1" and track "n+1" can be determined.

As the read/write head 108 continues to move along track "n", assuming the read/write head 108 stays on the centerline of track "n" without internal or external disturbance, then zero readback amplitude is detected from the C burst 306, and a full readback amplitude is detected from D burst 308. Information obtained from the C burst 306 and the D burst 308 can be used as additional or supplemental information regarding the position of the read/write head 108 with respect to the centerline of a track, or with respect to the border between a first track and a second track (e.g., between track "n" and track "n−1" or between track "n" and track "n+1"). The information from the C burst 306 and the D burst 308 can be used to confirm the position of the read/write head 108 or can provide information necessary to determine if the read/write head 108 is on the centerline of a track.

By reading the magnitude of the A burst 302, the B burst 304, the C burst 306, and the D burst 308, the read channel system 150 can perform the necessary spatial adjustment or correction to guide the read/write head 108 on track. The read channel system 150 can convert the single tone sinusoidal-like burst signals from the readback waveform into clean DC signals in order to measure or estimate the magnitude of the A burst 302, the B burst 304, the C burst 306, and the D burst 308.

PES Demodulation

As discussed above, the read/write head 108 passes over a servo wedge 146, the magnetization patterns within the servo wedge 146 yield a plurality of servo bursts in the readback signal (as will be discussed with respect to FIG. 3B) that provides an indication of the position of the read/write head 108 with respect to a desired track. The read channel system 150 can demodulate the servo bursts to determine the current location of the read/write head 108 and generate a PES estimate, which indicates a magnitude and direction of the position error. The PES can be monitored, and based on the current location of the read/write head 108 and the desired location, the position of the read/write head 108 can be adjusted.

During operation, the read channel system 150 can read data from the storage medium 104 and generate an analog readback signal based on the read data. The analog readback signal can be equalized or amplified such that the range of the amplified analog readback signal substantially matches a range of an ADC (e.g., ADC 158) used to provide corresponding digital samples based on the analog readback signal. The amplified analog readback also can be filtered to remove other undesirable noise and to shape the waveform of the amplified analog readback. A baseline adjustment can be performed on the amplified analog readback signal to remove DC content and to center the amplified analog readback signal to, for example, a midscale of the ADC before being converted into digital values. The amplified analog readback signal can be sampled (or oversampled) where the sampling can be data frequency locked by a clock.

In general, the amplified analog readback signal can be normalized with respect to gain and offset so that the amplified analog readback signal can fall into an expected signal range centered at zero. The amplified analog readback signal can be normalized with respect to gain and offset so that the readback signal can fall into an expected signal range centered at zero. With gain and offset normalization, the required dynamic range of subsequent components can be limited, which reduces power consumption and increases possible clock frequencies and data rates. Unwanted high-frequency noise also can be removed to permit sampling of the amplified analog readback signal without re-introducing the high-frequency noise back into the signal spectrum.

Digital samples can then be generated from the amplified analog readback signal where the digital samples can be filtered to match signal characteristics for bit detection and read channel compensated in the digital domain to produce a compensated digital signal that can be provided to other components of the read channel system 150 to produce a bit sequence from the compensated digital samples.

Figure 4:
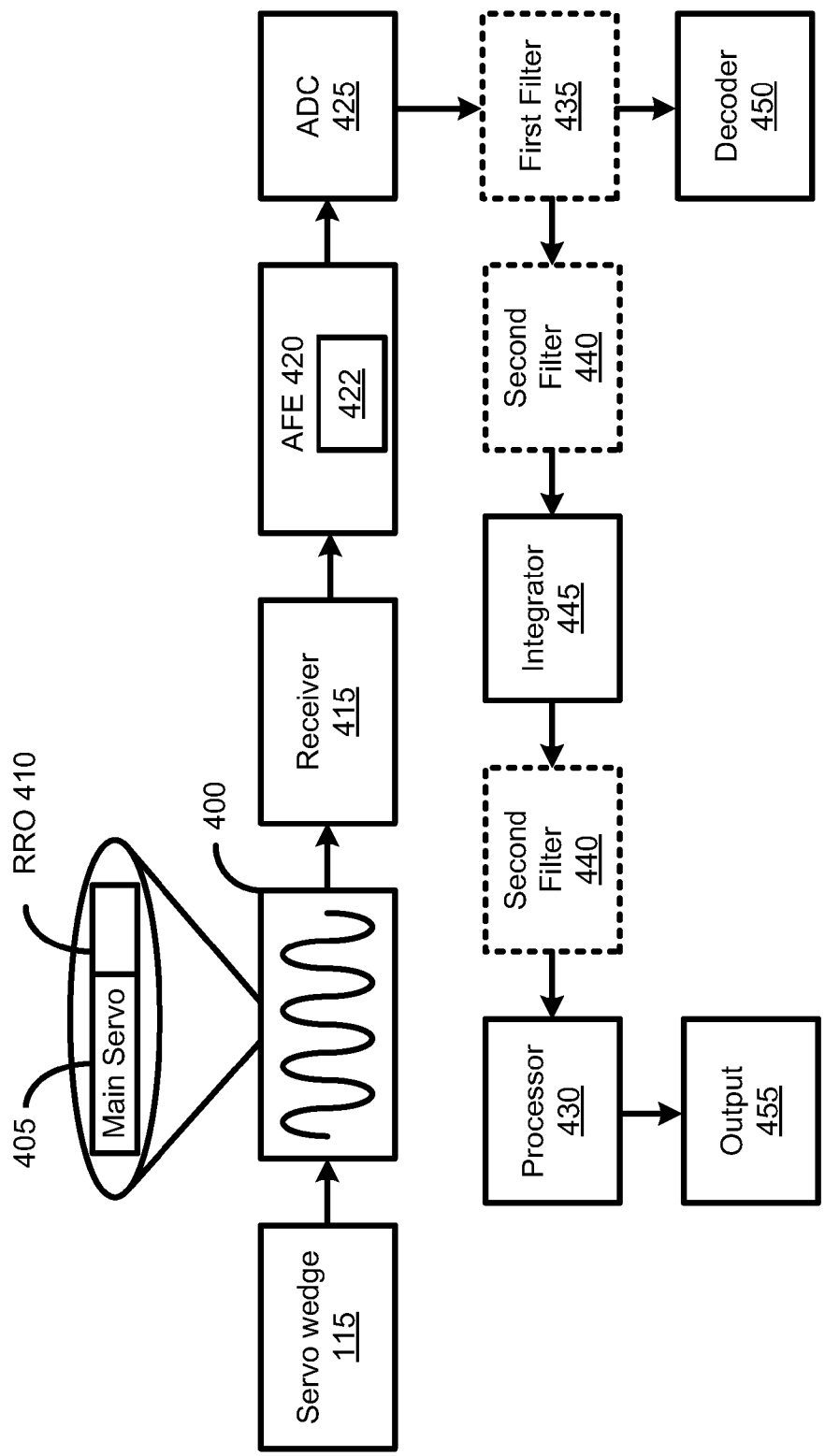
FIG. 4 shows an example of components of an analog readback channel system for processing a readback signal.

FIG. 4 shows an example of components of the analog readback channel system 150 for processing a readback signal based on information provided by one or more servo wedges 115. As shown in FIG. 4, a receiver 415 can receive an analog readback signal 400. The analog readback signal can include a main servo portion 405 and a RRO portion 410. The AFE 420 (e.g., which is similar to AFE 152 shown in FIG. 1B) can amplify the analog readback signal 400, and the amplified analog readback signal can be converted into digital signal containing digital samples by the ADC 425 (e.g., which is similar to ADC 158 shown in FIG. 1B). The ADC 425 can provide the digital signal as input to an optional first filter 435 (as indicated by its dashlines) before integration is performed by the integrator 445, as will be discussed in greater detail below.

In some implementations, the AFE 420 can include an AC-coupling circuit 422. In some implementations, the AC-coupling circuit 422 can be used to pass desired burst signals while rejecting noise components. Specifically, the AC-coupling circuit 422 can be used to reject DC signals and adjust the DC level inside the AC-coupling circuit 422 to match the DC level outside the AC-coupling circuit 422. For example, the AC-coupling circuit 422 can be used to reject DC offset value from the analog readback signal such that the desired transfer function is zero at DC, peaks at around the frequency of the PES fundamental frequency and drops to a low value after twice the peaking frequency.

The AC-coupling circuit 422 also can minimize voltage offsets between two or more components. For example, the AC-coupling circuit 422 can reduce an offset between pre-amplification circuitry (e.g., preamp circuit 112) and the AFE 420. The AC-coupling circuit 422 also can remove DC offset in the signal. For example, the DC offset can be removed through AC coupling and DC baseline correction. Providing DC correction can help keep the analog readback signal centered on the baseline. Output of the AC-coupling circuit 422 can be used as the midscale for the ADC 425 that permits the amplitude/phase to be optimally determined or estimated from the samples presented. Output of the AC-coupling circuit 422 also helps keep signal offsets from driving the signal amplitude or phase into saturation.

In some instances, too much gain can cause the ADC 425 sample values to rail at maximum or minimum ADC levels, whereas too little gain can cause quantization noise to dominate the SNR and adversely affect the bit error rate performance. In some implementations, the AFE 420 can include a variable gain amplifier (e.g., VGA 154) to provide gain control (e.g., as determined by an automatic gain control loop). Specifically, the VGA can control the signal level of the analog readback signal for optimum performance in the ADC 425.

The output of the ADC 425 can be fed to the optional first filter 435. In some implementations, the first filter 435 can include a low pass filter. The low pass filter can be used to reject noise and improve the SNR of the digital samples before integration. In some implementations, the low pass filter is a digital filter that provides digital filtering to the digital samples.

In some implementations, the cutoff frequency of the low-pass filter can be set at just past the peak of the main signal energy. After this point, the signal can be very small so that the signal is mostly dominated by noise. However, the low-pass filter can improve the signal quality by removing the noise. In a DC-PES scheme, the cutoff frequency can be set very low, because the main signal energy is at DC (e.g., frequency of 0 Hz.) However, since the servo burst can include multiple fields most of which have signal content at higher frequencies, in some implementations, the cutoff frequency can be set at ¼*Fs, where Fs is the sampling frequency to provide optimal configuration.

Alternatively, the low pass filter also can be an analog filter (e.g., where ADC 425 is not used). In some implementations, the AFE 420 also can include an internal low pass filter. In implementations where the AFE 420 includes an internal low pass filter, then the first filter 435 can be configured as an equalizing filter (as opposed to a low pass filter) to equalize the received samples to a target response for subsequent Viterbi detection. Alternatively, the first filter 435 can be omitted to simplify the read channel configuration.

The filtered output generated by the first filter 435 can be fed to a decoder 450 for subsequent decoding. The decoder 450 can extract the positioning data encoded in the filtered analog readback signal 400, and subsequently transmit the positioning data to other signal processing circuits (e.g., to FIR 160, STL 168 and/or AGC 166 shown in FIG. 1B). In some implementations, the decoder 450 can be associated with a detector gain target, and the detector gain target can be a function of a desired amplitude or phase of the filtered analog readback signal 400. In some implementations, the decoder 450 can decode the digital samples generated by the ADC 425 based on a Viterbi algorithm.

In some instances, passing a readback signal containing DC content through the AC-coupling circuit 422 (or near DC-coupled) can cause a drooping of the DC level of the DC content. This drooping can be attributed to the filter response of the AC-coupling circuit 422 to block the DC content, and can degrade the quality of the integrator output that is used to estimate the signal amplitude of the readback signal. Accordingly, in some implementations, a second filter 440 in addition to the first filter 435 can be used to compensate the drooping prior to integration. In some implementations, the second filter 440 can include a linear filter, and the linear filter can function to undo or limit the extent of the DC drooping before integration so as to improve the quality of the integrator output. While the second filter 440 is shown to precede the integrator 445, the second filter 440 also can be placed after the integrator 445 to correct the integrator output for the droop in the DC level as indicated in FIG. 4.

As discussed previously, the storage medium 104 can be a patterned media-type magnetic disk. In patterned media, the magnetic material on the disk surface can be patterned into small discrete data islands such that a single magnetic domain in each island or "bit" is formed. Each discrete island can be a magnetized island separated from other islands by nonmagnetic spaces. The term "nonmagnetic" means that the nonmagnetic spaces between the magnetized islands can be formed using, for example, a nonferromagnetic material, such as a dielectric, or a material that has no substantial impact to the readback signal in the absence of an applied magnetic field, or a magnetic material in a groove or trench recessed far enough below the islands to not adversely affect the readback signal. The nonmagnetic spaces can also be the absence of magnetic material, such as grooves or troughs in the magnetic recording layer or disk substrate. Discrete islands can be formed on the storage medium 104, and information or data can be written onto the discrete islands by changing the magnetization of the discrete bits.

After the islands are formed, the polarities of the islands can be defined to create a desired servo pattern. For example, the servo writing process can be performed by circumferentially writing one or more rows of islands to define the servo pattern. The servo pattern can include fields such as those shown in FIG. 2 (e.g., preamble fields, sync fields, PES fields and the like). A servo write process can be performed by writing to the islands row-by-row. Alternatively, the rows can be ½ track displaced as shown in FIG. 2 so that the polarities of the consecutive islands in a row can be defined.

For example, the write process can write an alternating polarity in consecutive islands in one PES subfield and a uniform polarity in consecutive islands in another PES subfield (e.g., PES A can be written with consecutive islands with alternating polarity of [−1, 1, −1, 1] and PES B can be written with consecutive islands with a same polarity of [1, 1, 1, 1]). Similarly, the servo write process can write a uniform polarity in consecutive islands in PES subfield C, and an alternating polarity in consecutive islands in PES subfield D. The foregoing process of writing to consecutive rows can be repeated until which the servo pattern is fully defined.

In sum, the islands in each PES field A-D can be used to determine the whole or fractional part of the radial position of the read/write head 108 with respect to the storage medium 104. When the read/write head 108 is at the track center (e.g., at track "n"), the readback signal amplitude associated with islands of PES A and those of PES B are equal. When the read/write head 108 is at the half-track position (e.g., between track "n" and track "n−1"), the readback signal amplitude associated with islands of PES C and those of PES D are equal. As the read/write head 108 moves off-track the amplitudes from all the islands would increase or decrease. The amplitudes of the PES islands can then be decoded by a read channel system (e.g., reach channel system 150) to reposition the head.

In some implementations, the servo or PES pattern can be written with a uniform polarity and in a single continuous island to maximize the amplitude and/or phase of the readback signal. For example, instead of writing the PES pattern alternatively in an alternate fashion (e.g., two bits with up polarity in a first island and another two bits with up polarity in a succeeding island), the PES pattern can be written continuously in one island (e.g., instead of multiple discrete pieces) so as to provide a reliable DC signal pattern that allows a maximum DC response while yielding little or no noise in the DC output signal. Because data is continuously written and read from a single continuous island (as opposed to from several discrete islands separated by nonmagnetic spacing), the signal power of the DC signal is increased (e.g., since the polarity is all in a same direction). If the PES pattern contains DC content, then more signals can be passed by the AFE 420, and the signal power at the input of amplitude/phase estimation can also be higher that can lead to a more reliable and accurate output.

A perpendicular recording channel can have a maximum response at or very near DC. To maximize the head signal swing (and thereby the signal power), a DC field can be used. A repeating pattern field (e.g., [1, 1, −1, −1]) can have a frequency that is far away from DC (e.g., $\frac{1}{4}*f_s$ where $f_s$ is the sampling frequency of the channel). The perpendicular recording channel can have a low response at this frequency, so the received signal power is generally lower than what the signal would have been if it were a DC signal. Accordingly, one driving factor to improve the signal output is to determine where the recording channel has a maximum response. While the AC-coupling circuit 422 can reject DC content, if the cutoff frequency associated with the AC-coupling circuit 422 is below a desirable threshold, then the AC-coupling circuit 422 may not have sufficient time to reject the DC content fully within the period of one DC field. In this event, however, the AC-coupling circuit 422 can still perform near-DC coupling with respect to the DC content.

As discussed above, the PES pattern can include a repeating sequence of bits written all in the same or different polarity, and the PES pattern also can be a single continuous field of magnetic material written with a uniform polarity, which can be used to generate a DC readback signal. In some implementations, the AC-coupling circuit 422 can be omitted, and in the absence of the AC-coupling circuit 422, the AFE 420 can perform DC-coupling filtering to allow DC content in the readback signal to pass. DC-coupling can be used to provide near DC-coupling filtering to allow energy at DC to be rejected.

In some implementations, near DC-coupling can behave like AC-coupling where the cutoff frequency is below a predetermined threshold such that the time-constant of the DC-rejection is very long with respect to the length of a DC field. For example, a DC field may last forty bits. If the AC-coupling cutoff frequency is very low (e.g., $\frac{1}{1000}*f_s$ where $f_s$ is the sampling frequency), then the time constant is approximately 166 bits (e.g., 1000/6), which would take a run of DC 166 bits long in order for the DC level to get rejected by 37% of its true level. If the DC field is only forty bits long, then the extent of the DC rejection would be far less so as to achieve near-DC coupling.

In some implementations, the AFE 420 can include a DC-coupling filter to allow DC content in the readback signal to pass. The DC-coupling filter can be configured with a sharp response near DC so that frequencies near DC can be passed. For example, the filter response can be designed such that DC content can be gradually rejected over a long period so that the DC content appears as a constant signal in a short timing window. Allowing the filter response to gradually reject the DC content is advantageous because less signal would be rejected by the AFE 420 if the PES pattern contains DC content so that a more accurate measurement of the position error can be performed.

In some implementations, the AC-coupling circuit 422 can be programmable that allows a desirable cutoff frequency to be programmed. For example, near-DC coupling can be achieved by programming the AC-coupling circuit 422 with a low cutoff frequency. In some implementations, where a pre-amplification circuit (e.g., preamp circuit 112) is used, the pre-amplification circuit can be served as a source of AC-coupling (e.g., which is external to the channel). In these implementations, both the preamp circuit and the AC-coupling circuit 422 can be set to provide a desirable cutoff frequency. In other implementations, AC coupling can be achieved with the preamp circuit even when the AC-coupling circuit 422 is already set with a cutoff frequency to provide true DC-coupling.

In some implementations, the read channel system 150 can include an integrator 445. The integrator 445 can be used to integrate the digital samples (e.g., PES signals) within a window from the ADC 425. The digital samples can be integrated by the integrator 445 so that any DC content present in the analog readback signal can be summed in the integrator 445, leading to a higher signal output. The integrator 445 also can increase the amplitude of the readback signal that can result in an improved detectable output signal without reducing the system dynamic range while yielding adequate SNR at the output of the integrator 445. The integrator 445 also can operate to increase or decrease the position error signals based on the digital outputs of the ADC 425 to minimize the DC power without affecting the signal output power.

In sum, the integrator 445 can integrate the digital samples to generate a plurality of integrated signals that represent the servo position error signals (digital PES signals). In some implementations, a digital-to-analog converter (DAC) can be used to convert the digital PES signals into analog PES signals to provide backward compatibility for back-end systems that receive the demodulated PES signals in analog form. Of course if the back-end system receives digital PES signals, the integrator 445 need not utilize the DAC.

In some implementations, the digital samples can be selected from a window size. The window size can be fixed or adjustable depending on the status of one or more components in the read channel or in the system generally. For example, if the read channel system 150 includes a variable gain amplifier between the AC-coupling circuit 422 and the ADC 425 (e.g., variable gain amplifier 154), the window size of integrator 445 can correspond to the gain of the variable gain amplifier. The window size also can be chosen to minimize the effects of noise. A properly chosen window size can be one that can adequately filter transient noise.

The output of integrator 445 can correspond to the analog readback signal from the AC-coupling circuit 422 after being converted into a digital signal by the ADC 425 and integrated by integrator 445. Because a baseline offset may be considered a net positive or negative voltage bias on the analog readback signal from the AC-coupling circuit 422, the integrator 445 can accumulate the offset over a given window period. The accumulated result can then be compared to an expected result, and thus any baseline offset in the analog readback signal can be detected. In some implementations, the integrator 445 can be a digital integrator. Alternatively, the integrator 445 can be an analog integrator (e.g., where ADC 425 is not used).

As the read/write head 108 travels across a desired track, the read/write head 108 can pick up DC signals from PES subfields of adjacent tracks at the same time. The combined drooping in the DC level of the resultant signal therefore may not be in general a linear process. To compensate for this non-linear DC-level droop, in some implementations, the second filter 440 can include a non-linear filter to restore the DC level and the linearize the readback signal before integration. In some implementations, the non-linear filter also can be placed after the integrator 445 to correct the integrator output for droop in DC-level and to compensate for non-linear effects at the integrator output.

The process 430 can receive and process a filtered signal from the second filter 440 (e.g., where the second filter is placed after the integrator 445) or an integrator output from the integrator 445 (e.g., where the second filter is placed before the integrator 445). The processor 430 can include processing circuitry to determine, for example, an estimate of the magnitude or the phase of the analog readback signal 400 based on the received filtered signal or the integrator output. In some implementations, the processor 430 can estimate the amplitude or phase associated with the digital representation of the analog readback signal 400, and the estimated amplitude or phase can be forwarded to the output 455 for use in subsequent adjustment of the position of the read/write head 108.

While the first filter 435 and the second filter 440 are shown in FIG. 4, one of ordinary skill in the art would readily appreciate that the first filter and the second filter are optional (e.g., as indicated by their corresponding dashlines), and can be omitted depending on a specific application.

Figure 5:
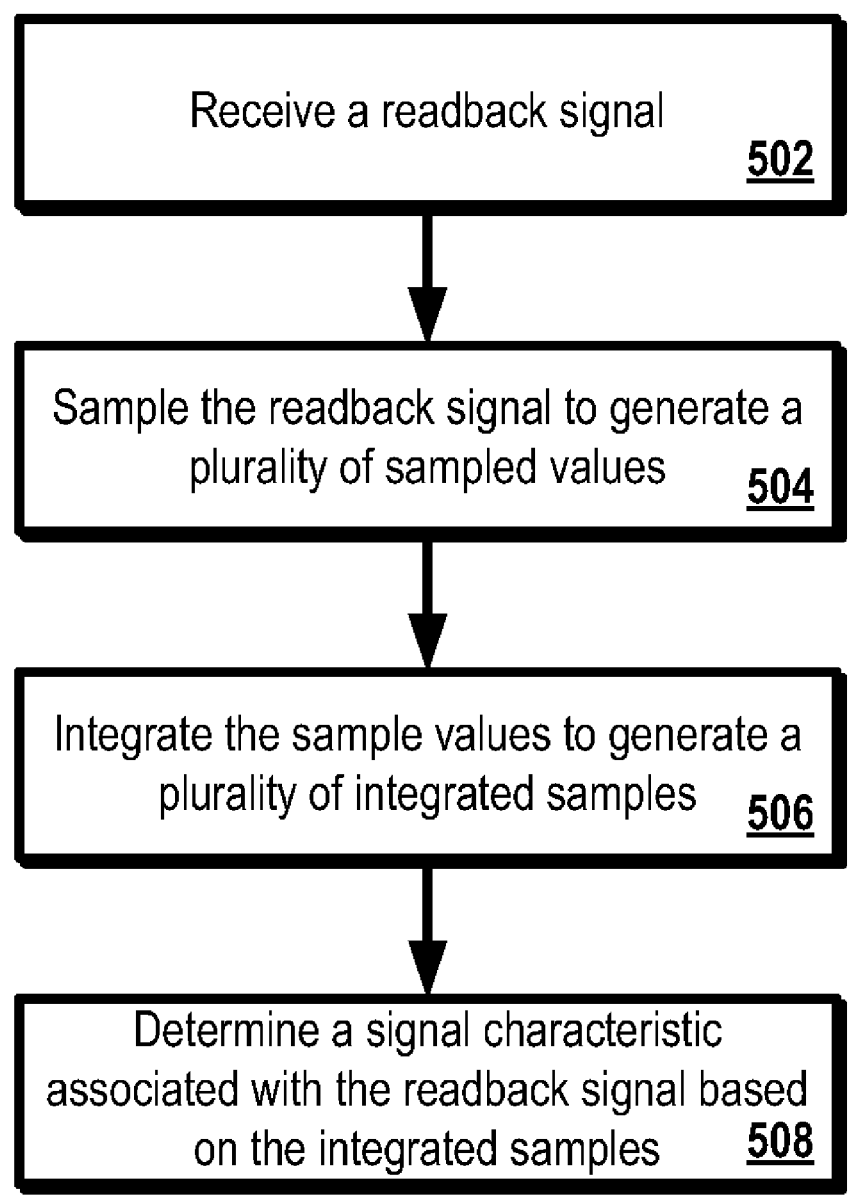
FIG. 5 shows an example of a process for generating an estimate of a position of a read/write head.

FIG. 5 shows an example of a process 500 for generating an estimate of a position of the read/write head 108. The process 500 can be performed, for example, by the read channel system 150, and for clarity of presentation, the description that follows uses the read channel system 150 as the basis of examples for describing the process 500. However, another system, or combination of systems, can be used to perform the process 500.

At 502, a readback signal is received. In some implementations, the readback signal can include positioning information associated with a read/write head in relation to a storage medium containing servo information from which the readback signal is generated. At 504, the readback signal can be sampled to generate a plurality of sampled values. At 506, the samples values can be integrated to generate a plurality of integrated samples. At 508, a signal characteristic associated with the readback signal can be determined based on the integrated samples.

Operations 502-508 can be performed in the order listed or in parallel (e.g., by the same or a different process, substantially or otherwise non-serially) to achieve the same result.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
   receiving a readback signal, the readback signal including positioning information that includes a plurality of servo burst fields associated with a position of a head of a storage medium;
   sampling the readback signal, including the plurality of servo burst fields, digitally to generate a plurality of sampled values;
   performing read channel compensation on the plurality of sampled values to generate a plurality of read channel compensated values, the performing read channel compensation comprising filtering the plurality of sampled values to match the sampled values to a signal quality suitable for bit detection prior to integration, the filtering including passing sampled values with a desirable frequency while blocking sampled values with frequencies outside the desirable frequency;
   integrating the read channel compensated values digitally to generate a plurality of digital integrated values; and
   determining a signal characteristic associated with the readback signal based on the digital integrated values.

2. The method of claim 1, where determining the signal characteristic includes determining at least one of an amplitude and a phase associated with the readback signal.

3. The method of claim 1, where receiving the readback signal includes receiving an analog readback signal, the method further comprising:
- converting the analog readback signal into a digital readback signal,
- where sampling the readback signal digitally includes sampling the digital readback signal.

4. The method of claim 1, where the filtering comprises:
- applying a first stage of filtering to the plurality of sampled values to match the sampled values to the signal quality; and
- applying a second stage of filtering to the filtered sampled values including compensating the filtered sampled values for drooping of a DC level associated with the readback signal.

5. The method of claim 1, where receiving the readback signal includes extracting information from a single continuous field of sequence of bits written in a same polarity from the storage medium.

6. The method of claim 1, where receiving the readback signal includes receiving a position error signal, the method further comprising:
- identifying a programmable cutoff frequency; and
- AC-coupling the position error signal based on the programmable cutoff frequency.

7. The method of claim 6, where identifying the programmable cutoff frequency includes identifying a cutoff frequency sufficiently low to achieve DC coupling that allows DC components associated with the position error signal to pass.

8. The method of claim 1, further comprising adjusting the position of the head based on the determined signal characteristic.

9. A device comprising:
- a read channel configured to demodulate a readback signal generated based on servo information written on a storage medium and to determine position information associated with a position of a head of the storage medium, the readback signal including a plurality of servo burst fields, the read channel including:
  - an analog front end to provide amplification to the readback signal, including the plurality of servo burst fields;
  - a sampler to generate a plurality of digital sampled values based on the amplified readback signal;
  - a compensation filter to filter the plurality of digital sampled values to generate a plurality of compensated values, the compensation filter to filter the plurality of digital sampled values to match the digital sampled values to a signal quality suitable for bit detection prior to integration, the compensation filter to pass digital sampled values with a desirable frequency and block digital sampled values with frequencies outside the desirable frequency; and
  - a digital integrator to digitally integrate the plurality of compensated values to generate a plurality of digital integrated values; and
- an output to output the digital integrated values through which the position information associated with the head is to be determined.

10. The device of claim 9, where the analog front end includes an AC-coupling circuit to filter out DC offsets present in the readback signal.

11. The device of claim 9, where the analog front end includes a DC-coupling circuit to allow DC content in the readback signal to pass to the sampler.

12. The device of claim 9, where the readback signal is generated based on servo information extracted from a single continuous field of sequence of bits written in a same polarity on the storage medium.

13. The device of claim 9, where the sampler includes an analog-to-digital converter; and
- where the plurality of digital sampled values are generated by the analog-to-digital converter.

14. The device of claim 9, where the compensation filter comprises:
- a first filter to filter the plurality of digital sampled values; and
- a second filter to compensate the plurality of filtered sampled values for drooping of a DC level associated with the readback signal.

15. The device of claim 14, where the second filter is a linear filter to limit the drooping before integration to improve a signal-to-noise ratio of the readback signal.

16. The device of claim 9, further comprising:
- a linear filter coupled to an output of the digital integrator to compensate the digital integrator output for the drooping.

17. The device of claim 14, where the second filter is a non-linear filter to provide linearization of and restore a DC level associated with the readback signal prior to integration.

18. The device of claim 9, further comprising:
- a non-linear filter coupled to an output of the digital integrator to compensate the digital integrator output for non-linear effects at the digital integrator output.

19. The device of claim 9, where the analog front end further includes an AC coupling circuit operating at a programmable cutoff frequency.

20. The device of claim 19, where the programmable cutoff frequency is programmed sufficiently low to achieve DC coupling that allows DC components associated with the readback signal to pass.

21. A system comprising:
- a head operable to read servo information from a storage medium and to produce a readback signal based on the servo information, the servo information being read from a single continuous field of sequence of bits written in a same polarity on the storage medium, the readback signal including a plurality of servo burst fields;
- an analog-to-digital converter to sample the readback signal and to produce a sampled digital signal;
- a finite impulse response filter to produce a filtered sampled digital signal, the finite impulse response filter to perform filtering on the sampled digital signal to match the sampled digital signal to a signal quality suitable for bit detection; and
- a read channel to:
  - demodulate the filtered sampled digital signal, which includes integrating digitally the filtered sampled digital signal;
  - determine position information associated with the head in relation to the storage medium from the demodulated digital signal; and
  - generate a control signal to adjust a position of the head based on the determined position information.

22. The system of claim 21, further comprising:
- an analog front end to provide equalization to the analog readback signal; and
- a decoder to decode the filtered sampled digital signal and to determine the position of the head based on the decoded signal.

* * * * *